United States Patent
Jin et al.

(10) Patent No.: US 12,358,795 B2
(45) Date of Patent: Jul. 15, 2025

(54) SYSTEM AND METHOD FOR WATER-BASED CHEMICAL-LOOPING HYDROGEN GENERATION

(71) Applicant: INSTITUTE OF ENGINEERING THERMOPHYSICS, CHINESE ACADEMY OF SCIENCES, Beijing (CN)

(72) Inventors: Hongguang Jin, Beijing (CN); Hao Zhang, Beijing (CN); Hui Hong, Beijing (CN); Yali Cao, Beijing (CN); Xiangyu Liu, Beijing (CN)

(73) Assignee: Institute of Engineering Thermophysics, Chinese Academy of Sciences, Beijing (CN)

( * ) Notice: Subject to any disclaimer, the term of this patent is extended or adjusted under 35 U.S.C. 154(b) by 694 days.

(21) Appl. No.: 17/629,835

(22) PCT Filed: Dec. 31, 2019

(86) PCT No.: PCT/CN2019/130504
§ 371 (c)(1),
(2) Date: Jan. 25, 2022

(87) PCT Pub. No.: WO2021/134475
PCT Pub. Date: Jul. 8, 2021

(65) Prior Publication Data
US 2022/0259043 A1    Aug. 18, 2022

(51) Int. Cl.
*C01B 3/48* (2006.01)
*C01B 3/56* (2006.01)
*C01B 32/50* (2017.01)

(52) U.S. Cl.
CPC ............ *C01B 3/48* (2013.01); *C01B 3/56* (2013.01); *C01B 32/50* (2017.08)

(58) Field of Classification Search
CPC ............ C01B 3/48; C01B 3/56; C01B 32/50
See application file for complete search history.

(56) References Cited

U.S. PATENT DOCUMENTS 6,767,530 B2    7/2004   Kobayashi et al.

FOREIGN PATENT DOCUMENTS

| CN | 102441396 | 5/2012 |
| CN | 102862956 | 1/2013 |
| CN | 107539948 | 1/2018 |
| CN | 110194437 | 9/2019 |

OTHER PUBLICATIONS

Chiron et al., Chemical Engineering Science, (2011), v.66, p. 6324-6330.*
Hafizi et al., International Journal of Hydrogen Energy, (2019), 44(33), p. 17864-17877. (Provided by Applicant).*
Hafizi et al., International Journal of Hydrogen Energy, (2019), 44(33), p. 17864-17877. (Disclosed in IDS).*
Hafizi et al., "Experimental Investigation of Improved Calcium-based CO2 Sorbent and Co2O4/SiO2 Oxygen Carrier for Clean Production of Hydrogen in Sorption-Enhanced Chemical Looping Reforming", International Journal of Hydrogen Energy, 2019, 44:17863-17877.
PCT International Search Report and Written Opinion in International Appln. No. PCT/CN2019/130504, dated Sep. 24, 2020, 10 pages.
Qiong-Qiong et al., "A Novel Mid-and Low Temperature Solar-Hybrid Gas Turbine Combined Cycle Using Perovskite-Chemical Looping Combustion", Journal of Engineering Thermophysics, Apr. 2019, 40(4):723-731.
Ipsakis et al., "Kinetic modeling of NiO-based oxygen carriers for the sorption enhanced chemical looping steam CH4 reforming," Materials Today: Proceedings, Jan. 2018, 5(14):27353-61, 9 pages.
Lee et al., "Sorption-enhanced water gas shift reaction for high-purity hydrogen production: Application of a Na-Mg double salt-based sorbent and the divided section packing concept," Applied Energy, Nov. 2017, 205:316-22, 7 pages.
Office Action in Chinese Appln. No. 20191142505 1.8, dated Mar. 3, 2021, 24 pages (with English translation).
Xiao et al., "Recent progresses on the preparation of the lithium-based sorbents for CO2 capture at high temperatures," Journal of Zhejiang Normal University (Nat. Sci.), May 2017, 40(2):174-180, 7 pages (English Abstract).
International Preliminary Report on Patentability in International Appln. No. PCT/CN2019/130504, mailed on Sep. 24, 2020, 7 pages.

* cited by examiner

*Primary Examiner* — Yong L Chu
(74) *Attorney, Agent, or Firm* — Fish & Richardson P.C.

(57) ABSTRACT

The present application provides a system and a method for water-based chemical-looping hydrogen generation. The method for water-based chemical-looping hydrogen generation comprises a water-based reduction process of oxygen carrier and a water-based oxidation process of oxygen carrier, wherein in the water-based reduction process of oxygen carrier, an oxygen carrier is reduced with a hydrocarbon fuel in the presence of a steam to produce a hydrogen gas as well as a reduced oxygen carrier and a carbon dioxide; and in the water-based oxidation process of oxygen carrier, the reduced oxygen carrier is oxidized with the steam to produce the hydrogen gas, while the reduced oxygen carrier is oxidized to its original state, thereby forming a chemical-looping. The present application can reduce the energy consumption while improving the efficiency of the hydrogen generation, enabling a zero energy consumption separation of carbon dioxide in the hydrogen generation process.

4 Claims, 2 Drawing Sheets

SYSTEM AND METHOD FOR WATER-BASED CHEMICAL-LOOPING HYDROGEN GENERATION

CROSS-REFERENCE TO RELATED APPLICATION

This application is a U.S. national phase filing under 35 U.S.C. § 371 of International Application No. PCT/CN2019/130504, filed Dec. 31, 2019, the entire contents which are incorporated herein by reference in their entirety.

TECHNICAL FIELD

The present disclosure relates to the field of thermochemical hydrogen generation, and particularly to a system and a method for water-based chemical-looping hydrogen generation.

BACKGROUND

Clean and efficient utilization of energy is the theme of development in energy field nowadays. In the process of the transition of the world's energy structure to clean energy, a number of countries including the United States of America, Japan, the European Union and China focus on the researches on hydrogen generation technologies. Therefore, hydrogen energy will become one of the important components of the world's energy structure in the future. Reducing the cost of hydrogen generation will play an irreplaceable role in facilitating the energy structure transition. Currently, 50% or more of the world's hydrogen comes from thermochemical hydrogen generation. In various hydrogen generation processes, thermochemical hydrogen generation is one of the most mature hydrogen generation processes.

Conventional thermochemical hydrogen generation methods mainly include hydrogen generation by direct decomposition of water, hydrogen generation by cyclic decomposition of water with a metal/metal oxide, hydrogen generation by natural gas-steam reforming, hydrogen generation by gasification of coal, hydrogen generation by cracking of fossil fuel, and the like. In the above hydrogen generation methods, endothermic hydrogen generation reactions mostly occur at a temperature of 900° C. or higher. This not only needs a heat source at high temperature to drive the reaction, but also proposes a large challenge to materials for forming the reactors. Here, as compared with other thermochemical hydrogen generation methods, natural gas-steam reforming can decrease the thermodynamic equilibrium temperature in the hydrogen generation reaction to 800° C. or lower, so as to reduce the requirements for the heat source temperature, the materials and the like. Thus, it is one of the most investigated thermochemical hydrogen generation technologies. In current natural gas-steam reforming processes, the reforming reaction of natural gas and steam needs a temperature of around 800° C., and is generally driven by supplying heat from the combustions of high grade natural gas, some producing hydrogen and the like. Natural gas and hydrogen are burned to supply heat. This not only results in severely irreversible combustion loss, but also increases the consumption of natural gas. In the existed natural gas-steam reforming hydrogen generation processes, it is required to consume 0.47-0.5 $m^3$ natural gas for producing per 1 $m^3$ hydrogen gas. Meanwhile, the difference in the Gibbs free energy $\Delta G$ before and after the reforming reaction at high temperature is much higher than the $\Delta G$ at an equilibrium temperature, which will also result in severely irreversible loss. Overall, in current natural gas-steam reforming hydrogen generation processes, the energy efficiency for conversion of natural gas to hydrogen is generally not more than 65%. In view of the current average price of natural gas of about 2.4 RMB/$Nm^3$, the cost for hydrogen generation is about 1.15 RMB/$Nm^3$. Lowering the reaction temperature during the thermochemical hydrogen generation can not only reduce the consumption of high grade natural gas and the irreversible combustion loss, but also reduce the irreversible loss of the hydrogen generation reaction. Therefore, it is an effective approach to reduce the cost for thermochemical hydrogen generation.

Natural gas chemical-looping reforming hydrogen generation is a novel natural gas-based hydrogen generation method emerging in the last decade. In the natural gas chemical-looping reforming hydrogen generation methods, a desired $H_2$ can be obtained by main steps of producing $CO_2$ and $H_2$ from endothermic reduction of an oxygen carrier with natural gas, and then separating $CO_2$ from the resulting product. An exothermic oxidation reaction between the reduced oxygen carrier and air can occur, to achieve a regeneration of the oxygen carrier and form a complete chemical-looping. As compared with the natural gas-steam reforming hydrogen generation, the temperature for hydrogen generation reaction can be decreased to 600-800° C. in the natural gas chemical-looping reforming hydrogen generation, and the heat required by the reduction reaction can be supplied by the exothermic oxidation. Therefore, the natural gas reforming hydrogen generation can both reduce the irreversible loss of the hydrogen generation reaction, and avoid the consumption of the fuel natural gas and the irreversible combustion loss thereof. However, in contrast to the natural gas-steam reforming hydrogen generation, all the product hydrogen in the natural gas chemical-looping reforming comes from $CH_4$, and the hydrogen production of the latter is about ⅓ lower than the former when the total natural gas consumption is the same. How to further decrease the temperature for natural gas-based hydrogen generation reaction and increase the yield of hydrogen generation is a main goal for further reducing the cost for natural gas-based hydrogen generation at present.

SUMMARY

The present disclosure provides a system and a method for water-based chemical-looping hydrogen generation so as to at least partially solve the above-mentioned technical problems.

In order to achieve the above object, the technical solutions of the present disclosure are as follows.

In one aspect, the present disclosure provides a method for water-based chemical-looping hydrogen generation, comprising a water-based reduction process of oxygen carrier and a water-based oxidation process of oxygen carrier, wherein:

in the water-based reduction process of oxygen carrier, an oxygen carrier is reduced with a hydrocarbon fuel in the presence of a steam to produce a hydrogen gas as well as a reduced oxygen carrier and carbon dioxide; and in the water-based oxidation process of oxygen carrier, the reduced oxygen carrier is oxidized with steam to produce a hydrogen gas, while the oxygen carrier is oxidized to its original state, thereby forming a chemical-looping.

In another aspect, the present disclosure provides a system for a water-based chemical-looping hydrogen generation, comprising at least one reactor provided with an oxygen carrier, and a feed unit, wherein a gas mixture of a hydrocarbon fuel and a steam is introduced into the reactor by the feed unit for a water-based reduction process of oxygen carrier, in which an oxygen carrier is reduced with the hydrocarbon fuel in the presence of the steam to produce a hydrogen gas as well as a reduced oxygen carrier and a carbon dioxide; or a steam is separately introduced into the reactor for a water-based oxidation process of oxygen carrier, in which the reduced oxygen carrier is oxidized with the steam to produce the hydrogen gas, while the reduced oxygen carrier is oxidized to its original state, thereby forming a chemical-looping.

In yet another aspect, the present disclosure provides a gas separation method for separating carbon dioxide in a chemical-looping hydrogen generation, comprising: reducing an oxygen carrier with a hydrocarbon fuel in the presence of a steam to produce a hydrogen gas as well as a reduced oxygen carrier and a carbon dioxide; absorbing the produced carbon dioxide with a carbon dioxide absorbent to facilitate production of the hydrogen gas while separating the carbon dioxide; and desorbing the absorbed carbon dioxide after the reaction where the oxygen carrier is reduced with the hydrocarbon fuel in the presence of a steam to produce the hydrogen gas is ended, to obtain a desorbed carbon dioxide, thereby achieving the gas separation of the carbon dioxide and the hydrogen gas.

DETAILED DESCRIPTION

Figure 1:
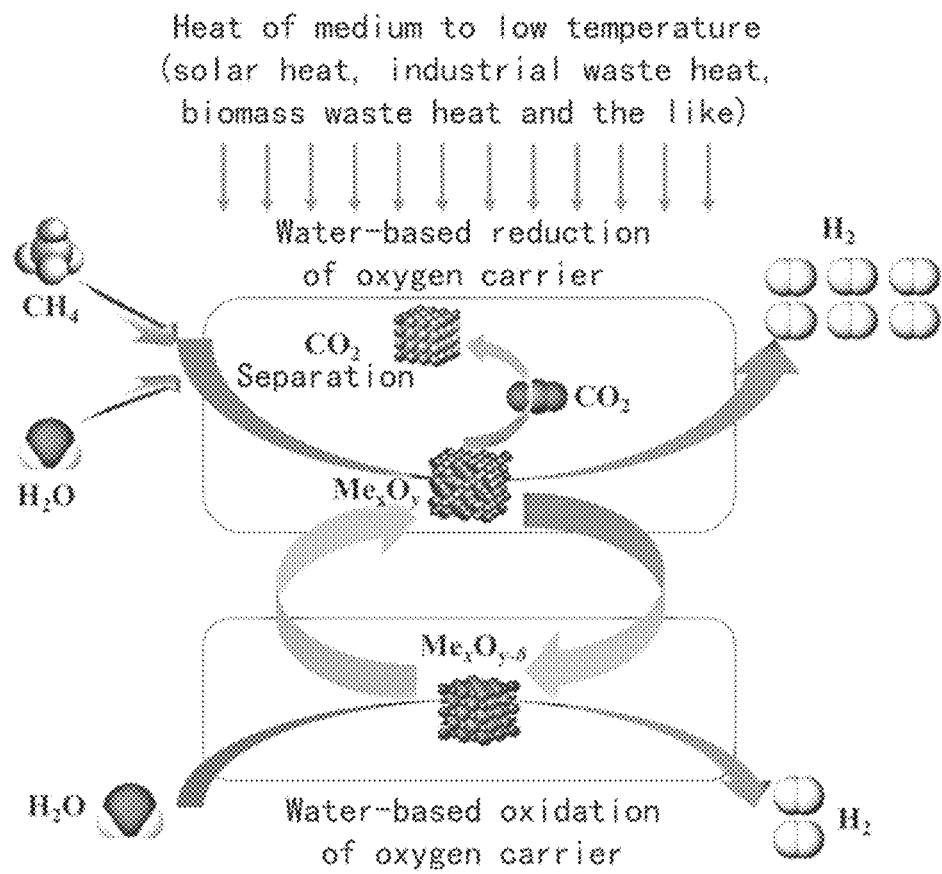
FIG. 1 is a schematic principle diagram for a method for water-based chemical-looping hydrogen generation according to the present disclosure.

According to some embodiments, the present disclosure provides a water-based chemical-looping hydrogen generation, the principle of which is as shown in FIG. 1. The method comprises a water-based reduction process of oxygen carrier and a water-based oxidation process of oxygen carrier; wherein in the water-based reduction process of oxygen carrier, an oxygen carrier is reduced with a hydrocarbon fuel in the presence of a steam to produce $H_2$ as well as a reduced oxygen carrier and $CO_2$; and in the water-based oxidation process of oxygen carrier, the reduced oxygen carrier is oxidized with the steam to produce a hydrogen gas, while the reduced oxygen carrier is oxidized to its original state, thereby forming a chemical-looping.

For the convenience of description, the hydrocarbon fuel is, for example, methane, but is not limited thereto. For example, the hydrogen fuel may also be ethane or propane. Here, two water-based hydrogen generation reactions for the water-based reduction process of oxygen carrier and the water-based oxidation process of oxygen carrier are represented by the following equations:

Water-Based Reduction of Oxygen Carrier:

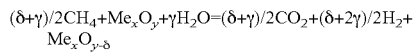

Water-Based Oxidation of Oxygen Carrier:

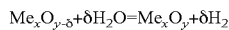

A complete chemical-looping is formed by those two hydrogen generation reactions, and the gaseous products are both $H_2$. As compared to conventional chemical-looping hydrogen generation, the production of $H_2$ can be improved, and the consumption of hydrocarbon fuel can be reduced, thereby reducing the cost for thermochemical hydrogen generation.

Here, the method for water-based chemical-looping hydrogen generation further comprises absorbing $CO_2$ in the reaction product with a $CO_2$ absorbent in the water-based reduction process of oxygen carrier to facilitate production of $H_2$. Specifically, available absorbents comprise $Li_4SiO_4$, a hydrotalcite-like compound and the like. Such absorbents have good absorptivity to $CO_2$, can desorb $CO_2$ by heating, which is a simply process. For example, the absorption of $CO_2$ by $Li_4SiO_4$ is represented by the following equation:

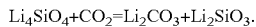

Here, the method for water-based chemical-looping hydrogen generation further comprises a step of desorbing the absorbed $CO_2$ after the hydrogen generation reaction in the water-based reduction process of oxygen carrier is ended. The desorbing process can be adjusted depending on the absorbent used. For example, $Li_4SiO_4$ can desorb $CO_2$ by heating. The desorbed $CO_2$ is purged with an inert gas to achieve the regeneration and reuse of the absorbent.

Thus, the chemical equilibrium of the water-based reduction reaction of the oxygen carrier is broken by separating $CO_2$, so as to drive the reaction towards producing $H_2$, which facilitates the decrease in the reaction temperature required for the endothermic reduction from 800° C. to around 500° C. and therefore reduces the requirements for the grade of heat source for the endothermic reduction.

Here, the $CO_2$ absorbent and the oxygen carrier alternately arranged distributed, such that the hydrocarbon fuel and the steam sequentially flow through a region of the oxygen carrier and a region of the $CO_2$ absorbent alternately, wherein the water-based reduction reaction of the oxygen carrier predominantly occurs when the hydrocarbon fuel and the steam flow through the region of the oxygen carrier, while the absorption reaction occurs when the hydrocarbon fuel and the steam flow through the region of the absorbent. Those two reactions occur alternately to facilitate the full conversion of the hydrocarbon fuel, thereby improving the efficiency of hydrogen generation.

Here, the oxygen carrier has a porous structure, which provides flow channels for hydrocarbon fuel and steam, while ensuring that the hydrocarbon fuel and steam can be sufficiently contacted with the oxygen carrier to facilitate the oxygen carrier reduction. The oxygen carrier is selected from one or more of $Fe_2O_3/Al_2O_3$, $NiO/NiAl_2O_4$ and $LaCu_{0.1}Ni_{0.9}O_3$.

Here, the temperature for the water-based reduction reaction of the oxygen carrier is 300-550° C., which is significantly lower than the reaction temperature for the chemical-looping hydrogen generation known in the art. Therefore, medium to low grade heat energies such as solar heat, industrial waste heat and biomass waste heat can be used as heat sources for driving the reaction.

Thus, with developments of technologies complementary to thermochemistry such as solar energy, fossil fuel and biomass energy, technologies for complementary use of multiple energy sources are becoming increasingly mature. A medium to low grade heat energy at 500° C. or lower provided by industrial waste heats such as medium to low concentrated solar energy, metallurgy, chemical engineering, coal gasification, biomass gasification and coking, is used as a heat source to drive the water-based natural gas-based hydrogen generation reaction. This can not only reduce the consumption of high grade natural gas and the irreversible loss of the hydrogen generation reaction, but also increase the yield of hydrogen gas, thereby contributing to reducing the cost of hydrogen generation.

Figure 2:
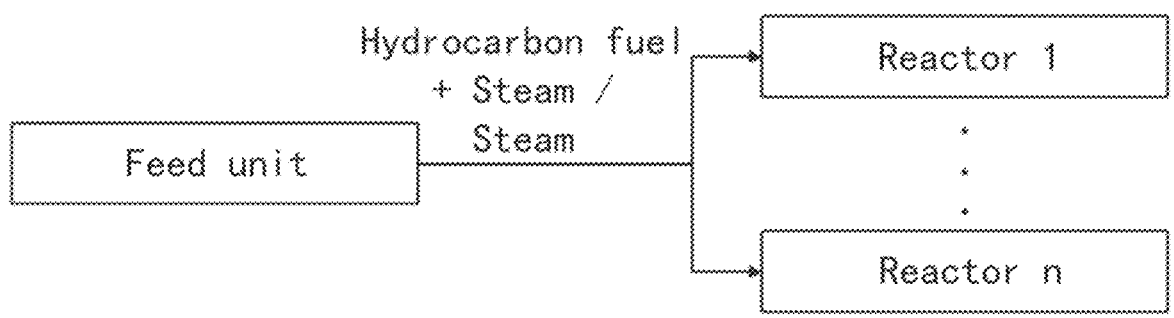
FIG. 2 is a block structure diagram for a system for water-based chemical-looping hydrogen generation according to the present disclosure.

Based on the above method for water-based chemical-looping hydrogen generation, the present disclosure further provides a system for water-based chemical-looping hydrogen generation, as shown in FIG. 2. The system comprises at least one reactor containing an oxygen carrier, and a feed unit, wherein a mixture of a hydrocarbon fuel and steam is introduced into the reactor by the feed unit for a water-based reduction process of oxygen carrier, in which the oxygen carrier is reduced with the hydrocarbon fuel in the presence of the steam to produce $H_2$ as well as a reduced oxygen carrier and $CO_2$; or steam is separately introduced into the reactor for a water-based oxidation process of oxygen carrier, in which the reduced oxygen carrier is oxidized with the steam to produce $H_2$, while the reduced oxygen carrier is oxidized to its original state, thereby forming a chemical-looping.

Here, the reactor is further provided with the aforementioned $CO_2$ absorbent. The $CO_2$ absorbent and the oxygen carrier are alternately arranged in the reactor, such that the hydrocarbon fuel and the steam sequentially flow through a region of the oxygen carrier and a region of the absorbent alternately. The types of the absorbent and the oxygen carrier are the same as above, and will not be reiterated here.

Here, the system for water-based chemical-looping hydrogen generation further comprises a desorption unit for desorbing the absorbed $CO_2$ from the reactor after the hydrogen generation reaction in the water-based reduction process of oxygen carrier is ended, such that the absorbent can be regenerated and reused.

Based on the above technical solution, the present disclosure further provides a gas separation method for carbon dioxide in a chemical-looping hydrogen generation, comprising: reducing an oxygen carrier with a hydrocarbon fuel in the presence of a steam to produce $H_2$ as well as a reduced oxygen carrier and $CO_2$; absorbing the produced $CO_2$ with a $CO_2$ absorbent to facilitate production of $H_2$ while separating the $CO_2$; and desorbing the absorbed $CO_2$ after the reaction where the oxygen carrier is reduced with the hydrocarbon fuel in the presence of a steam to produce $H_2$ is ended, to obtain a desorbed $CO_2$, thereby achieving the gas separation of the $CO_2$.

The technical solutions of the present disclosure will be described in detail by way of particular examples. It should be noted that the particular examples below are merely illustrative, but are not intended to limit the present disclosure.

Example 1

Figure 3:
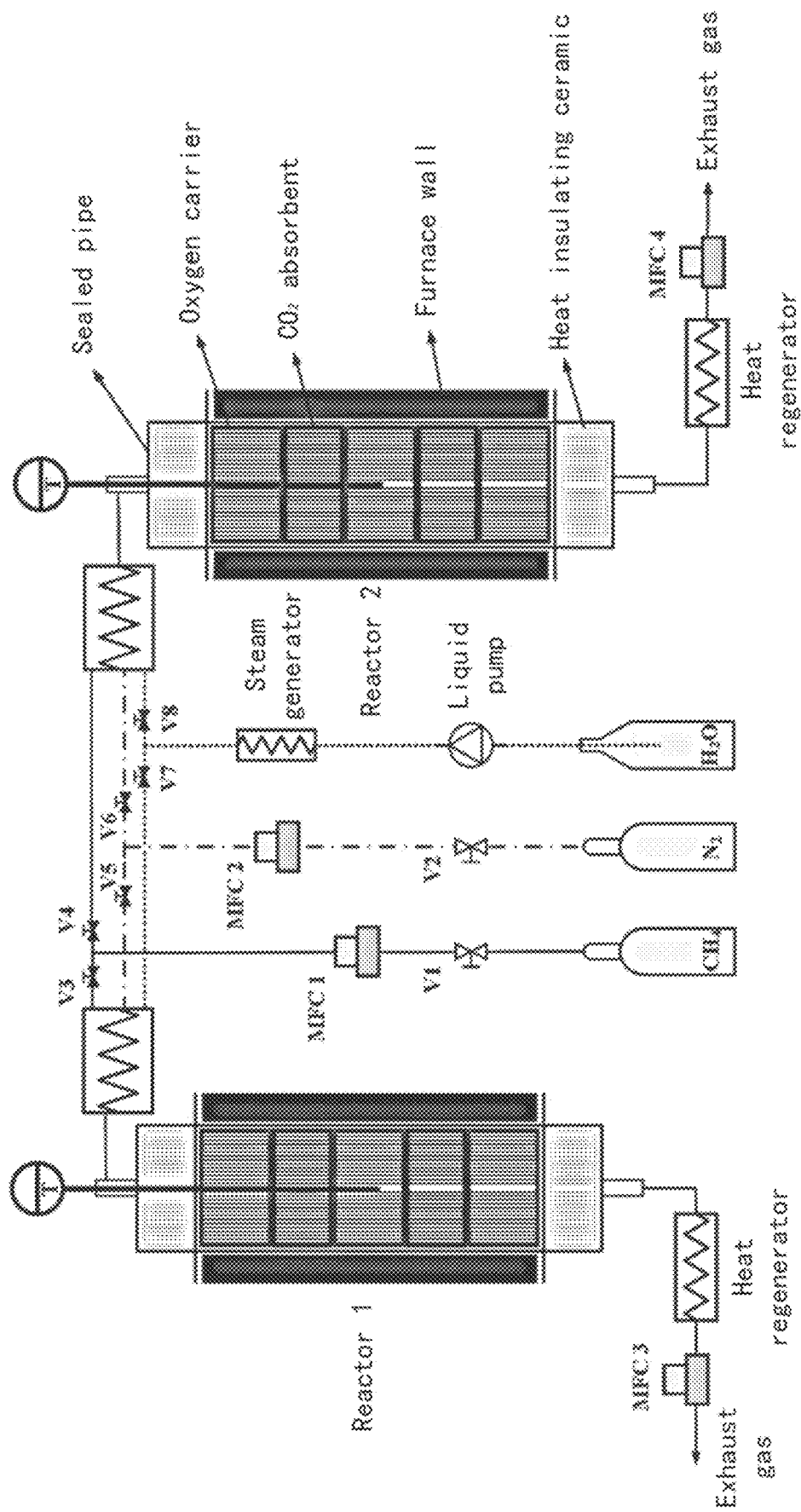
FIG. 3 is a schematic structure diagram for a system for water-based chemical-looping hydrogen generation according to an embodiment of the present disclosure.

FIG. 3 is a schematic structure diagram for a system for water-based chemical-looping hydrogen generation according to an example of the present disclosure. As shown in FIG. 3, in the present example, $CH_4$ is used as the hydrocarbon fuel; $Fe_2O_3/Al_2O_3$ is used as the oxygen carrier, wherein $Al_2O_3$ serves as a support and $Fe_2O_3$ serves as a reactant to participate in the two reactions for water-based hydrogen generation; and $Li_4SiO_4$ is used as the $CO_2$ absorbent. The two reactions for water-based hydrogen generation and the overall reaction are represented by the following Equation (1), Equation (2) and Equation (3) respectively:

Reduction: $CH_4+Fe_2O_3+H_2O=CO_2+2FeO+3H_2$
$\Delta H=222.19$ kJ/mol (1)

Oxidation: $2FeO+H_2O=Fe_2O_3+H_2$ $\Delta H=-28.04$ kJ/mol (2)

Overall reaction: $CH_4+2H_2O=CO_2+4H_2$ $\Delta H=184.15$ kJ/mol (3)

In the present example, two same reactors, Reactor 1 and Reactor 2, are used, for example. The interiors of Reactor 1 and Reactor 2 are respectively divided into a plurality of neighboring regions, in which porous bulk $Fe_2O_3/Al_2O_3$ and $Li_4SiO_4$ are alternately arranged.

The valves V1, V3 and V7 are opened, and $CH_4$ and steam are preheated and mixed, and then introduced into Reactor 1. At this time, Reactor 1 is a reactor for a water-based reduction of oxygen carrier. The inlet gas sequentially flows through a region of $Fe_2O_3/Al_2O_3$ and a region of $Li_4SiO_4$ alternately. When the inlet gas flows through the region of $Fe_2O_3/Al_2O_3$, reductions represented by Equation (4) and Equation (5) mainly occur, and the gas products mainly comprise $CO_2$, CO and $H_2$. When the inlet gas continues to flow through the region of $Li_4SiO_4$, absorption reactions represented by Equation (6) and Equation (7) mainly occur, and the gas products mainly comprise $H_2$. When the inlet gas continues to flow through remaining regions of $Fe_2O_3/Al_2O_3$ and regions of $Li_4SiO_4$, the above processes are repeated, until all of the $CH_4$ introduced into the reactor are converted.

Reduction between $CH_4$ and $Fe_2O_3$: $CH_4+2Fe_2O_3=CO_2+2H_2+4FeO$ (4)

$CH_4+Fe_2O_3=CO+2H_2+2FeO$ (5)

Reaction between CO and steam: $CO+H_2O=CO_2+H_2$ (6)

$CO_2$ absorption: $Li_4SiO_4+CO_2=Li_2CO_3+Li_2SiO_3$ (7)

Here, in Reactor 1, the thermodynamic equilibrium of the water-based reduction of the oxygen carrier is broken by separating the CO and $CO_2$ from the gas product during the reaction, such that the reaction temperature required for the endothermic reduction can be decreased from around 800° C. to around 500° C., thereby reducing the requirements for the grade of the heat source for use in the endothermic reduction.

Meanwhile, the valve V8 is opened, and steam is preheated and then introduced into Reactor 2. At this time, Reactor 2 is a reactor for a water-based oxidation of oxygen carrier. In Reactor 2, the oxygen carrier has been in a reduced-state. Steam is used as an oxidant for the oxidation regeneration of the oxygen carrier, as represented by Equation (2) above. The oxygen carrier is regenerated by acquiring oxygen from $H_2O$, and the gas product is $H_2$.

After the reactions in those two reactors are completed, the supplying of gas into the reactors are stopped, while the reactor for water-based reduction is heated to perform the $CO_2$ desorption as represented by Equation (8) below, and those two reactors are purged with an inert gas of $N_2$. Therefore, the $CO_2$ absorbent is regenerated, while a gas separation of purer $CO_2$ can be achieved without introducing additional energy consumption. After the purging, the inlet gases into those two reactors are interchanged by switching the valves between the open and close states. Reactor 1 is switched to a reactor for a water-based oxidation of oxygen carrier, and Reactor 2 is switched to a reactor for a water-based reduction of oxygen carrier, and the above processes for water-based chemical-looping hydrogen generation are repeated.

$$CO_2 \text{ desorption: } Li_2CO_3 + Li_2SiO_3 = Li_4SiO_4 + CO_2 \quad (8)$$

Conventional natural gas-steam reforming hydrogen generation and the water-based chemical-looping hydrogen generation according to the present example are analyzed and compared as for energy consumption. The results are as shown in Table 1 below. The analysis results show that as compared to conventional natural gas-steam reforming hydrogen generation, the natural gas consumption for producing per 1 m³ hydrogen gas can be reduced from 0.473 m³ to 0.438 m³ in the water-based chemical-looping hydrogen generation.

In addition, in the analysis of the above water-based chemical-looping hydrogen generation, the heat required for the endothermic reduction is supplied by the combustion of $CH_4$. It can be appreciated that if the heat is supplied to the endothermic reduction from medium to low temperature heat sources such as concentrated solar heat, industrial waste heat and biomass waste heat, the natural gas consumption for the water-based chemical-looping hydrogen generation can be further reduced.

TABLE 1

| Item | Natural gas-steam reforming | Water-based chemical-looping |
|---|---|---|
| Raw natural gas flow rate (m³/h) | 1224 | 1224 |
| Fuel natural gas flow rate (m³/h) | 100 | 415 |
| Water/carbon ratio | 3/1 | 3/1 |
| Reaction temperature (° C.) | ~840 | ~500 |
| Reaction pressure (bar) | 17 | 17 |
| Net hydrogen production (m³/h) | 2807 | 3742 |
| Energy efficiency for conversion of natural gas to hydrogen (%) | 65.55 | 70.64 |
| Unit consumption of natural gas (m³ · $CH_4$/m³ · $H_2$) | 0.472 | 0.438 |

Based on the results of the investigation and experiments, the system and the method for water-based chemical-looping hydrogen generation according to the present disclosure have at least one or at least a part of the following benefits.

(1) A chemically active oxygen carrier is used in the present disclosure. Thus, in the water-based reduction of oxygen carrier, the oxygen carrier is reduced with a hydrocarbon fuel in the presence of a steam to produce a hydrogen gas, and in the water-based oxidation of oxygen carrier, the oxygen carrier is oxidized with steam to produce a hydrogen gas. As compared to conventional methane-steam reforming hydrogen generation process, the reaction temperature for the thermochemical hydrogen generation can be decreased. The water-based reduction of oxygen carrier can occur at around 500° C., and the water-based oxidation of oxygen carrier can occur at around 600° C. Thus, the requirement for the grade of energy source is reduced.

(2) Two water-based hydrogen generation reactions are utilized in the present disclosure. In the oxidation regeneration of the oxygen carrier, steam is used as an oxidant instead of air. The oxygen carrier is oxidized and regenerated by acquiring oxygen from $H_2O$, and the gas product is $H_2$. This improves the $H_2$ production by a factor of 2 as compared to conventional chemical-looping hydrogen generation. In the method for water-based chemical-looping hydrogen generation of the present disclosure, the natural gas consumption for producing per 1 m³ hydrogen gas is reduced from 0.47-0.5 m³ to 0.41-0.44 m³, facilitating the reduction of the cost for thermochemical hydrogen generation.

(3) In the reduction of the oxygen carrier according to the present disclosure, simultaneously, CO and $CO_2$ in the gas product are separated to break the thermodynamic equilibrium of the hydrogen generation reaction, driving the reaction towards producing the hydrogen gas. This facilitates the decrease in the temperature for the hydrogen generation reaction and therefore reduces the irreversible loss of the hydrogen generation reaction, thereby improving the energy conversion efficiency of thermochemical hydrogen generation from about 65% to 70% or more.

(4) In the present disclosure, since a $CO_2$ absorbent is used in the reduction of the oxygen carrier, the gas separation of $CO_2$ can also be achieved synchronously in addition to facilitating the hydrogen generation reaction, such that relatively pure $CO_2$ can be separated with zero energy consumption.

So far, the embodiments of the present disclosure are described in detail with reference to the drawings. It should be noted that in the drawings or the description, all implements which are not depicted or described are forms known to those skilled in the art, and are not described in detail. Moreover, the definitions on various elements and processes are not only limited to specific structures, shapes or manners mentioned in the embodiments, and can be simply changed or substituted by those skilled in the art. For example, there may be only one reactor. In this case, unlike Example 1, continuous proceeding of the water-based oxidation and reduction reactions of oxygen carrier by switching two reactors cannot be achieved. There may also be more than two reactors, so as to achieve continuous proceeding of the water-based oxidation and reduction reactions of oxygen carrier.

The above particular embodiments are given for describing the objects, technical solutions and benefits of the present disclosure in detail. It should be understood that the above embodiments are only some particular embodiments of the present disclosure, but not intended to limit the present disclosure. Any variations, equivalents, modifications and the like made within the spirit and principle of the present disclosure should be included within the protection scope of the present disclosure.

The invention claimed is:

1. A method for water-based chemical-looping hydrogen generation, comprising a water-based reduction process of oxygen carrier and a water-based oxidation process of oxygen carrier, wherein:

in the water-based reduction process of oxygen carrier, an oxygen carrier is reduced with a hydrocarbon fuel in the presence of a steam to produce a hydrogen gas as well as a reduced oxygen carrier and a carbon dioxide, wherein the oxygen carrier is selected from one or more of porous $Fe_2O_3/Al_2O_3$, porous $NiO/NiAl_2O_4$ and porous $LaCu_{0.1}Ni_{0.9}O_3$, and the carbon dioxide is absorbed with a carbon dioxide absorbent to facilitate production of the hydrogen gas, and the absorbed carbon dioxide is desorbed after the reaction is ended, wherein a reaction temperature in the water-based reduction process of oxygen carrier is 300-550° C., and the carbon dioxide absorbent is lithium orthosilicate and/or a hydrotalcite-like compound; and in the water-based oxidation process of oxygen carrier, the reduced oxygen carrier is oxidized with a steam to produce a hydrogen gas, while the reduced oxygen carrier is oxidized to its original state, thereby forming a chemical-looping.

2. The method for water-based chemical-looping hydrogen generation according to claim 1, the absorbed carbon dioxide is desorbed by heating the carbon dioxide absorbent;

the carbon dioxide absorbent and the oxygen carrier are alternately arranged, such that the hydrocarbon fuel and the steam sequentially flow through a region of the oxygen carrier and a region of the carbon dioxide absorbent alternately.

3. The method for water-based chemical-looping hydrogen generation according to claim 1, wherein the hydrocarbon fuel is selected from one or more of methane, ethane and propane.

4. The method for water-based chemical-looping hydrogen generation according to claim 1, wherein in the water-based reduction process of oxygen carrier, a solar heat, an industrial waste heat or a biomass waste heat is used as a heat source.

\* \* \* \* \*